United States Patent
Grosskinsky et al.

(10) Patent No.: US 8,619,924 B2
(45) Date of Patent: Dec. 31, 2013

(54) CIRCUIT, USE, AND METHOD FOR CONTROLLING A RECEIVER CIRCUIT

(75) Inventors: Ulrich Grosskinsky, Neudenau (DE); Werner Blatz, Leingarten (DE)

(73) Assignee: Atmel Corporation, San Jose, CA (US)

( * ) Notice: Subject to any disclaimer, the term of this patent is extended or adjusted under 35 U.S.C. 154(b) by 718 days.

(21) Appl. No.: 12/710,861

(22) Filed: Feb. 23, 2010

(65) Prior Publication Data

US 2010/0215131 A1    Aug. 26, 2010

Related U.S. Application Data

(60) Provisional application No. 61/155,067, filed on Feb. 24, 2009.

(30) Foreign Application Priority Data

Feb. 24, 2009  (DE) .......................... 10 2009 010 115

(51) Int. Cl.
    *H04L 27/06*   (2006.01)
(52) U.S. Cl.
    USPC ........... 375/344; 375/340; 375/324; 375/327; 375/329; 375/332; 375/373; 375/376
(58) Field of Classification Search
    USPC .......... 375/340, 324, 327, 329, 332, 373, 376
    See application file for complete search history.

(56) References Cited

U.S. PATENT DOCUMENTS

| 4,827,431 A | 5/1989 | Goldshtein |
| 5,301,210 A * | 4/1994 | Vandamme et al. .......... 375/329 |
| 6,097,703 A | 8/2000 | Larsen et al. |
| 2007/0147570 A1* | 6/2007 | Lin .............................. 375/375 |

FOREIGN PATENT DOCUMENTS

DE    695 23 478 T2    5/2002

OTHER PUBLICATIONS

Yasunori Iwanami, "Demodulation of CPFSK and GMSK Signals Using Digital Signal Processing DPLL with Sequence Estimator", IEICE Trans. Commun., vol. E84-B, No. 1, Jan. 1, 2001, pp. 26-35.
Gupta et al., "Adaptive Linear Predictive Frequency Tracking and CPM Demodulation", Signals, Systmes and Computers, 2003. Conference Record of the ThirtySeventh Asilomar Conference on vol. 1, Nov. 9-12, 2003, pp. 202-206.

* cited by examiner

*Primary Examiner* — Kabir A Timory
(74) *Attorney, Agent, or Firm* — Baker Botts LLP

(57) ABSTRACT

A circuit, use, and method for controlling a receiver circuit is provided, wherein a complex baseband signal is generated from a received signal, a phase difference between a phase of the complex baseband signal and a phase precalculated from previous sampled values is determined, the phase difference is compared with a first threshold, a number is determined by counting the exceedances of the first threshold by the phase difference, a number of the counted exceedances is compared with a second threshold, and the receiver circuit is turned off if the number of counted exceedances exceeds the second threshold within a time period.

10 Claims, 3 Drawing Sheets

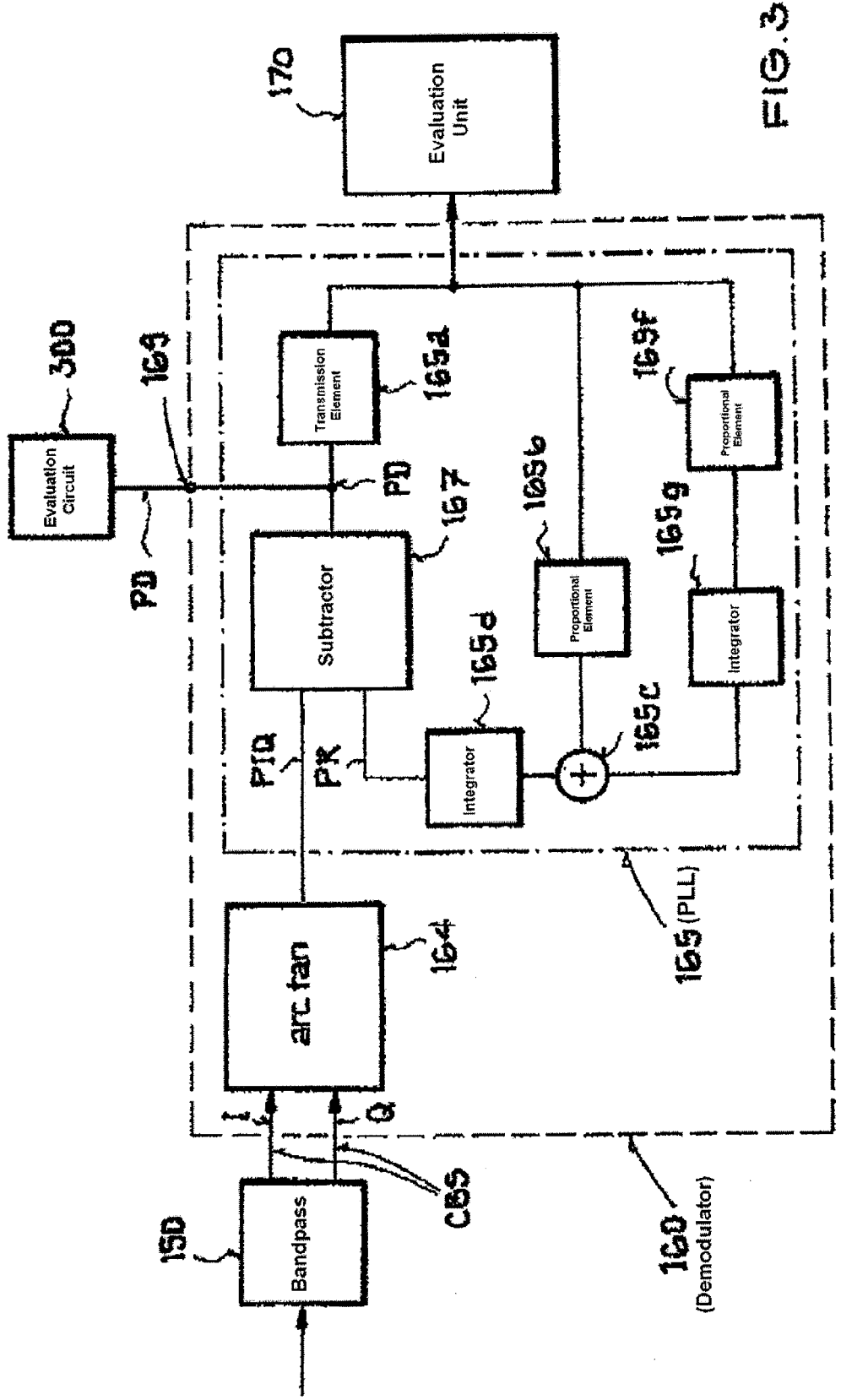

CIRCUIT, USE, AND METHOD FOR CONTROLLING A RECEIVER CIRCUIT

This nonprovisional application claims priority to German Patent Application No. DE 10 2009 010 115.2, which was filed in Germany on Feb. 24, 2009, and to U.S. Provisional Application No. 61/155,067, which was filed on Feb. 24, 2009, and which are both herein incorporated by reference.

BACKGROUND OF THE INVENTION

1. Field of the Invention

The present invention relates to a circuit, a use, and a method for controlling a receiver circuit.

2. Description of the Background Art

A receiver with a digital phase-locked loop is known from IEICE TRANS. COMMUN., Vol. 84-B, No. 1, pp. 26-35, January 2001, "Demodulation of CPFSK and GMSK Signals Using Digital Signal Processing DPLL with Sequence Estimator." The digital phase-locked loop (DPLL) has a subtractor, which subtracts a feedback phase, generated in the loop, from an input phase. The phase difference obtained by the subtraction is called a phase error. The digital phase-locked loop is part of a demodulator, which demodulates a signal for a decision circuit for obtaining data from an in-phase part and a quadrature phase part of a baseband signal.

Receivers of this type can be used for, for example, the transmission of measured data, for motor vehicle access systems, or for satellite communication.

SUMMARY OF THE INVENTION

It is therefore an object of the invention to improve a receiver as much as possible. Accordingly, a circuit is provided which can be monolithically integrated in a semiconductor chip.

In an embodiment, the circuit can have a receiver circuit for receiving a modulated signal. The receiver circuit has analog and digital subcircuits, such as, for example, an input amplifier, a mixer, filter, and an analog-to-digital converter.

The circuit can have a digital control unit for controlling the receiver circuit. The control unit has, for example, a microcontroller or a logic circuit with a control output. For controlling, the control unit can be connected to a control input of the receiver circuit.

The receiver circuit can be formed to determine and to output a phase difference. The receiver circuit is formed to determine the phase difference between a phase of a complex baseband signal and a phase precalculated from previous sampled values. The phase of the complex baseband signal can be determined from the in-phase component (I) and the quadrature phase component (Q), therefore the real part and the imaginary part of the complex baseband signal, for example, by means of the arc tangent function. As is typical in electrotechnology, the phase can be understood to be the angle value from the Euler representation. The phase can be a digital numerical value. The complex baseband signal is generated by the receiver circuit particularly by downmixing and analog-to-digital conversion. To generate the sampled values, samplings of the signal take place, which are controlled by a clock signal.

The precalculated phase is calculated from previous sampled values. For the calculation, the sampled values preceding in time are averaged and/or weighted, for example. In so doing, the number of the previous sampled values necessary for this depends on the sampling rate employed.

The circuit has an evaluation circuit, which for evaluating the phase difference is connected to the receiver circuit and the control unit. The evaluation circuit is set up to compare the phase difference with a first threshold. The evaluation circuit is set up to output an output signal depending on a number of exceedances of the first threshold by the phase difference.

The control unit is set up to turn off the receiver circuit depending on the output signal of the evaluation circuit. To this end, the control unit evaluates the output signal. For the evaluation, the control unit has, for example, a hard-wired, particularly clock-controlled logic or a programmable arithmetic unit. For example, the output signal of the evaluation circuit forms an interrupt signal (interrupt) for interrupting a program routine of the control unit.

The object of the invention further is to provide as improved a method as possible for controlling a receiver circuit. Accordingly, a method for controlling a receiver circuit is provided.

In the method, a complex baseband signal is generated by the receiver circuit from a received signal by downmixing and analog-to-digital conversion. A sampling occurs for the analog-to-digital conversion.

A phase difference between a phase of the complex baseband signal and a phase precalculated from previous sampled values is determined. The phase difference is compared with a first threshold.

In the method, a number is determined by counting the exceedances of the first threshold by the phase difference. The number of counted exceedances is compared with a second threshold.

In the method, the receiver circuit is turned off if the number of counted exceedances exceeds the second threshold within a particularly predefinable time period. The time period is established, for example, by a number of samplings.

The object of the invention further is to provide a use. Accordingly, a use is provided of a phase difference, determined by means of a phase-locked loop, between a phase of a complex baseband signal, generated from a received signal, and a phase, precalculated from previous sampled values, for controlling a turning off of a receiver circuit.

The embodiments described hereinafter relate to the circuit, as well as to the use and to the method for controlling a receiver circuit.

It is provided in an embodiment that a check of the quality of the received signal by the evaluation circuit is repeated continuously without interruption. For this purpose, for example, the counter is set back in a time-controlled manner, particularly cyclically.

According to an embodiment, it is provided that the receiver circuit is turned on event-controlled and/or time-controlled. The receiver circuit can be turned on event-controlled, for example, if a response is expected after the transmission of data. For the time-controlled turning on, the control circuit can be designed to turn on the receiver circuit cyclically.

It is possible to determine from the previous sampled values the phase, to be precalculated, via a moving average calculation or, e.g., frequency-based. However, in an embodiment, the receiver circuit has a digital phase-locked loop for precalculation. The phase-locked loop is formed to precalculate a phase from the previous sampled values. The phase-locked loop therefore enables a prediction of the next phase value with which the input phase of the complex baseband signal is compared. The phase-locked loop can be part of a digital demodulator.

According to an embodiment, the phase-locked loop has a subtractor for outputting the phase difference. The subtractor subtracts preferably digital values of the precalculated phase from values of the phase determined from the complex baseband signal.

The evaluation circuit can be formed for the variable setting of the first threshold. The evaluation circuit can have a control input for setting the first threshold. The first threshold is set preferably as a function of a data rate. For example, the first threshold and/or the second threshold are formed by a threshold value constant in each case. Alternatively, the first threshold and/or the second threshold are formed as a function in a time-dependent manner or as a function of the samplings.

In an embodiment, the evaluation circuit can have a first comparator, which is formed with the receiver circuit for comparing the phase difference with the first threshold. If the first threshold of the first comparator is exceeded, the output signal of the first comparator changes.

The evaluation circuit can have a counter for determining the number of exceedances. Preferably, the counter is set up to count the clock signals as a function of the output signal of the first comparator.

According to an embodiment, the evaluation circuit moreover can have a second comparator, which is set up for comparing the number (of exceedances), determined by the counter, with a second threshold. An output signal, dependent on the comparison result, of the evaluation circuit is output by the second comparator, when the number output by the counter exceeds the second threshold.

According to an embodiment, the evaluation circuit can have a control input for setting the first threshold and/or the second threshold. The first threshold and/or the second threshold are set application-specific by the control circuit, particularly as a function of the data rate. The control circuit can be also formed for setting the time period, the time period being adapted to the sensitivity required by the application or the data rate.

The second threshold is, for example, a constant value. In another embodiment variant, it is provided that the second threshold is a function of the clock signal of the samplings. The function is preferably formed as a monotonically increasing function. As a result, the second threshold is increased continuously in the clock of the samplings during the comparison. As a result, the sensitivity of the received signal quality determination can be increased. The function in the simplest case is a rising straight line.

It is provided in an embodiment that the first comparator can be formed as a digital discriminator. The first comparator can be formed as a digital window discriminator.

If no erroneous signal is determined by the evaluation circuit, the signal quality moreover can occur after the demodulator, for example, by means of evaluation of a correlation result or by means of parity bits. In this case as well, the receiver circuit can be turned off in the case of the deficient signal quality.

The embodiments are especially advantageous both individually and in combination. In this regard, all refinement variants can be combined with one another. Some possible combinations are explained in the description of the exemplary embodiments shown in the figures. These possible combinations of the refinement variants, depicted therein, are not definitive, however.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 3 shows a schematic circuit diagram of a demodulator.

DETAILED DESCRIPTION

Figure 1:
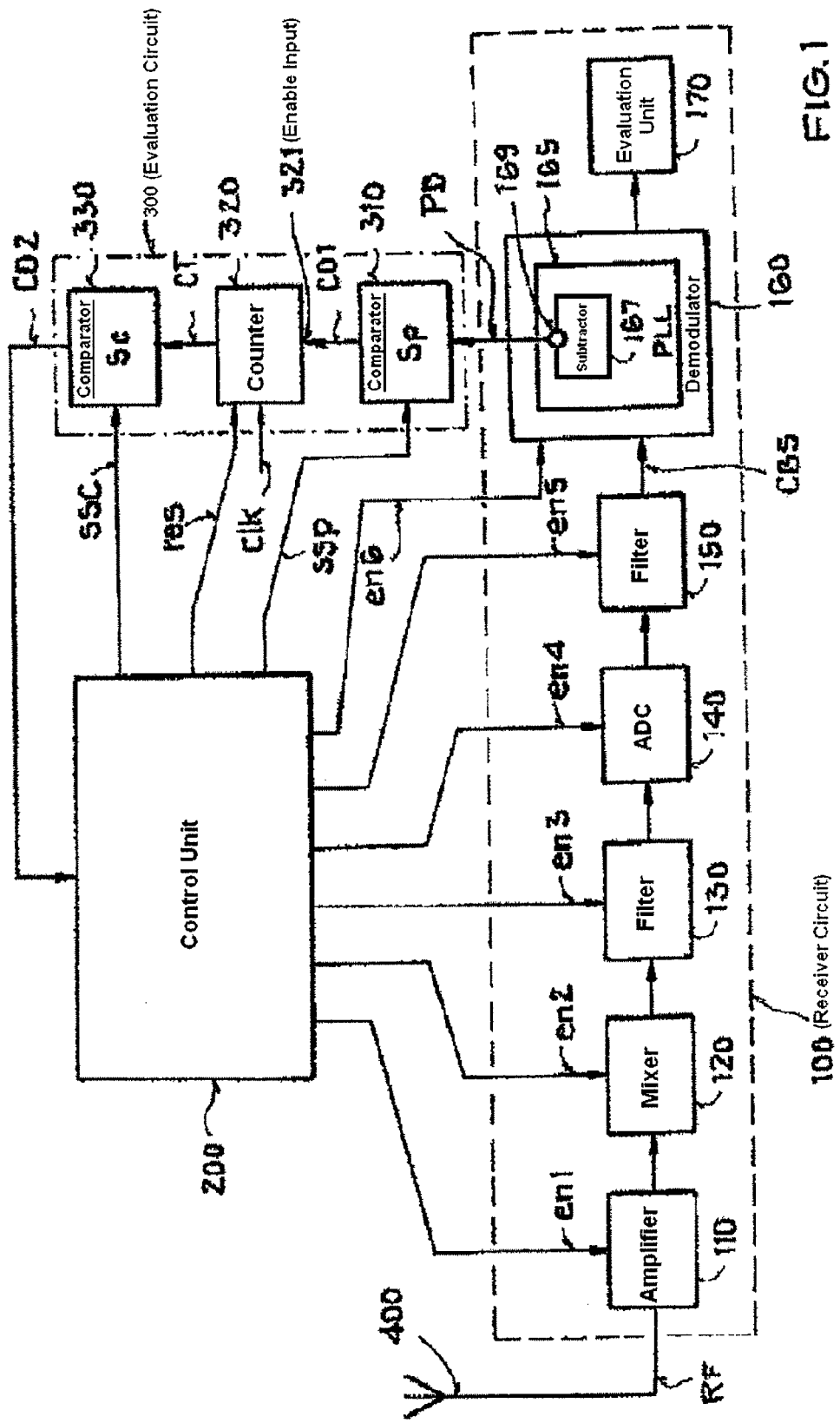
FIG. 1 shows a schematic circuit diagram of a circuit.

A circuit by a schematic circuit diagram is shown in FIG. 1. The circuit has a receiver circuit 100 to which an antenna 400 can be connected. Receiver circuit 100 has a plurality of analog and digital subcircuits, whereby in FIG. 1 an input amplifier 110, a mixer 120, an analog filter 130, an analog-to-digital converter 140, a digital filter 150, a digital demodulator 160, and a digital evaluation unit 170 are shown as a block merely by way of example.

Receiver circuit 100 has digital demodulator 160 for demodulation of a complex baseband signal CBS. Demodulator 160 has a digital phase-locked loop 165 (PLL). Phase-locked loop 165 in this regard can be of the first or a higher order.

Phase-locked loop 165 has a subtractor 167 for outputting a phase difference as a signal PD at output 169. Preferably, subtractor 167 is connected for subtraction of a phase, fed back with control loop 165, from an input phase at the input of phase-locked loop 165. The control behavior of phase-locked loop 165 tries to regulate the phase difference PD at the output of subtractor 167 to zero. A value of the phase difference PD is generated in this regard for each sampled value of the complex baseband signal CBS. A phase is precalculated from previous sampled values by phase-locked loop 165, so that the phase difference is the difference between this precalculated phase and the current phase of the complex baseband signal CBS.

In the exemplary embodiment of FIG. 1, subcircuits 110, 120, 130, 140, 150, 160 of receiver circuit 100 are controllable by one control signal each en1, en2, en3, en4, en5, en6. The particular subcircuit is turned on and off by means of control signal en1, en2, en3, en4, en5, en6. Subcircuits 110, 120, 130, 140, 150, 160 have an enable input (enable) for this purpose. The possibility of controlling each subcircuit 110, 120, 130, 140, 150, 160 of the receiver circuit separately by an associated control signal en1, en2, en3, en4, en5, or en6 can be used in a startup process to turn on subcircuits one after another and to turn on subcircuits, not yet required, in their order later during the startup process. As a result, it is made possible to reduce the total current consumption by receiver circuit 100. If the functionality of the reception is not required, all subcircuits 110, 120, 130, 140, 150, 160 of receiver circuit 100 can be turned off at the same time. Control signals en1, en2, en3, en4, en5, en6 are generated by a control unit 200.

Control unit 200 is shown only as a block in FIG. 1. The control unit is, for example, a microcontroller or a logic circuit, for example, a state machine. Control unit 200 is connected in addition to an evaluation circuit 300. Evaluation circuit 300 and control unit 200 in this regard can also be formed together as a circuit block, whereby the functions of evaluation unit 300 are reproduced, for example, in a program routine of a microcontroller. It is preferably provided, however, that evaluation circuit 300 is designed as separate hardware, so that the functionality of evaluation circuit 300 is available parallel to control unit 200 and no resources of control unit 200 are used.

Evaluation circuit 300 has a first comparator 310, which is connected to output 169 of subtractor 167 for comparing the phase difference with a first threshold Sp. If the first threshold Sp is exceeded by the phase difference, an output value CO1 of first comparator 310 changes. First comparator 310 has an input for setting the first threshold Sp. The threshold Sp can be set by a control signal ssp by control unit 200, for example, by applying a threshold value or by storing a threshold value in first comparator 310.

Evaluation circuit 300 has a counter 320, which for counting is connected to first comparator 310. The output value CO1 of first comparator 310 is applied in this regard to an enable input 321 (enable) of the counter. Counter 320 is connected as a function of the output value CO1 of first comparator 310 to count the clock pulses clk (for example, of the clock for sampling) at its clock input. Counter 320 can be reset via a control input by a reset control signal res by control unit 100. The counter value CT is output at the output of counter 320.

Evaluation circuit 300 has a second comparator 330, which is set up for comparing the counter value CT of counter 320 with a second threshold Sc. If the counter value CT exceeds the threshold Sc, the output signal CO2 of second comparator 330 and thereby evaluation circuit 300 changes. This change of the output signal of evaluation circuit 300 is evaluated by control unit 200, for example, within an interrupt program routine (interrupt). The second threshold Sc of second comparator 330 can be set by control unit 200 by means of the control signal ssc. For this purpose, second comparator 330 has a control input, to which, for example, a threshold value of the second threshold Sc is applied or can be written in a memory of second comparator 330.

Control unit 200 is set up to turn off receiver circuit 100 depending on the output signal CO2 of second comparator 330 of evaluation circuit 300.

The circuit of FIG. 1 brings about that a complex baseband signal CBS with an in-phase component I and a quadrature phase component Q is generated from a signal RF received via antenna 400 by means of subcircuits 110, 120, 130, 140, and 150. Digital demodulator 160 is used in synergy for demodulation of the complex baseband signal CBS for evaluation unit 170 and for outputting the phase difference PD.

In this regard, only the phase difference PD is considered below. The phase difference in this regard depends on the input phase due to the complex baseband signal CBS. A phase-locked loop 165 of demodulator 160 is used to generate phase difference PD. Phase-locked loop 165 has a subtractor 167, which at its output 169 outputs the phase difference PD. This phase difference PD in this regard is large in terms of amount, when there is a large change in the phase of the complex baseband signal CBS. Accordingly, large changes in the input phase compared with the previous sampled values are evaluated by the first threshold Sp. A large change in the input phase occurs especially with a greatly disrupted reception or when an extraneous signal is received. In these two cases, no data can be received in any event by receiver circuit 200, so that it is a goal to again turn off receiver circuit 200 as rapidly as possible to save current and thus to enable a prolonged operating time in the case of a battery-operated circuit.

Also in the case of possible reception of data, large phase differences PD above the first threshold Sp can occur in isolated cases. To make evaluation circuit 300 insensitive to these small disruptions, which are unimportant for reception, counter 320 and second comparator 330 are provided with the second threshold Sc, so that a minimum number of large phase changes is determined first before receiver circuit 100 is turned off by a control unit 200.

The functionality of the circuit will be described in greater detail below with use of a schematic diagram in FIG. 2.

In the top part of the diagram, the phase difference PD is shown relative to the time t. The first threshold Sp which has two threshold values is also shown, so that the amount of the threshold Sp can be exceeded by phase difference PD in the positive and negative range. All values of the phase difference PD are time-discrete because of the samplings.

The counter value CT is shown graphically relative to the time t below the phase difference PD. Beginning at the point in time t0, the first threshold Sp is exceeded several times by the phase difference PD, so that the counter value CT increases accordingly. At the point in time toff, the counter value CT exceeds the second threshold Sc within the time period td between the times t0 and t1. In the bottom part of the diagram, it is shown that the control signal enx changes its state from high to low at the point in time toff, so that receiver circuit 100 is turned off in the low state.

After a time interval, control unit 100 again turns on receiver circuit 200 for renewed reception. The cyclic turning on is also called polling.

An example of a demodulator 160 with a phase-locked loop 165 is shown schematically as a block diagram in FIG. 3. Demodulator 160 has two inputs for an in-phase component I and the quadrature phase component Q of the baseband signal CBS, which are connected to bandpass 150. The in-phase component I and the quadrature phase component Q reach a first transmission element 164, which is connected to the inputs and has an arc tangent function. Accordingly, a time-dependent phase PIQ, which is formed from the in-phase component I and from the quadrature phase component Q, is output at the output of the first transmission element 164. The time-dependent phase PIQ in this regard has a value range of from −p to p.

The time-dependent phase PIQ reaches a subtractor 167 connected to the output of first transmission element 164. Subtractor 167 compares by subtraction the time-dependent phase PIQ with a time-dependent phase PR which is precalculated by the elements 165a, 165b, 165c, 165d, 165f, 165g of phase-locked loop 165 from previous samplings and therefore from previous values of the in-phase component I and the quadrature phase component Q of the baseband signal CBS.

The output of subtractor 167 is connected to a second transmission element 165a with a nonlinear transmission function. Evaluation circuit 300 is connected in addition to the output of subtractor 167.

As shown further in FIG. 3, demodulator 165 has a first proportional element 165b and a first integrator 165d, which are connected to one another via a summator 165c. Proportional element 165b is connected further to second transmission element 165a and to the output of demodulator 160. Evaluation unit 170 is connected to the output of demodulator 160.

The output of integrator 165d outputs the time-dependent phase PR to an input of subtractor 167. The loop comprising subtractor 167, first transmission element 165a, first proportional element 165b, and first integrator 165d in this regard based on the output signal at the output of demodulator 160 and on the input frequency has approximately proportional-controller properties.

Demodulator 160 moreover has a second proportional element 165f and a second integrator 165g for forming a phase-locked loop of the second order. In this regard, the input of second proportional element 165f is connected to the output of second transmission element 165a, the output of second proportional element 165f to an input of second integrator 165g, and an output of second integrator 165g to summator 165c.

Figure 2:
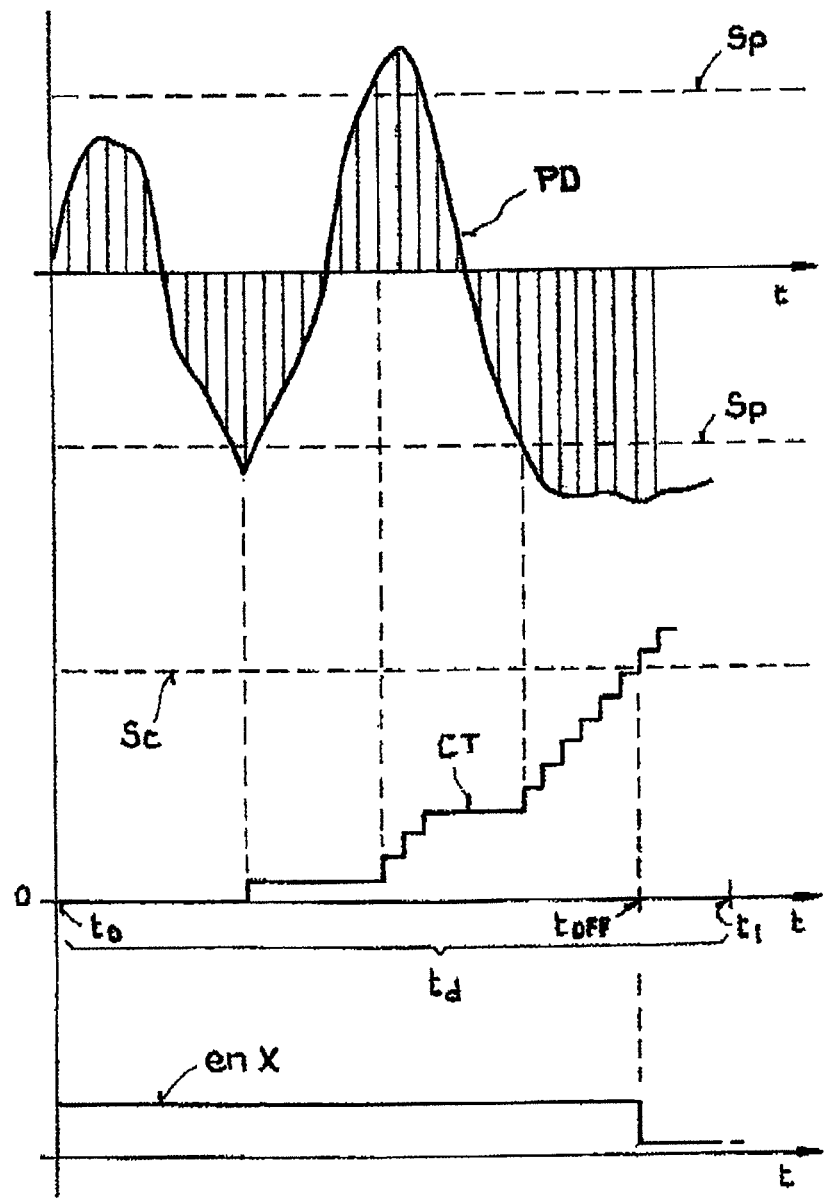
FIG. 2 shows a schematic diagram.

The invention is not limited to the shown embodiment variants in FIGS. 1 through 3. For example, it is possible to provide a different receiver circuit for generating a complex baseband signal. It is also possible to determine the phase change rate of the complex baseband signal in a different way. The functionality of the circuit according to FIG. 1 can be used especially advantageously for a radio system in a motor vehicle.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A circuit comprising:
a receiver circuit configured to receive a modulated signal;
a control unit configured to control the receiver circuit, the receiver circuit configured to output a phase difference between a phase of a complex baseband signal and a phase precalculated from previous sampled values;
an evaluation circuit, which for evaluating the phase difference is connectable to the receiver circuit and the control unit, the evaluation circuit being configured to compare the phase difference with a first threshold and configured to output an output signal based on a number of exceedances of the first threshold by the phase difference, wherein the control unit is configured to turn off the receiver circuit based on the output signal of the evaluation circuit;
wherein:
the evaluation circuit has a control input for setting the first threshold; and
the evaluation circuit has a first comparator, which is formed with the receiver circuit or with the output of a subtractor for comparing the phase difference with the first threshold, wherein the evaluation circuit has a counter configured to determine the number of exceedances, the counter being configured to count a clock signal as a function of an output signal of the first comparator, and wherein the evaluation circuit has a second comparator, which is configured to compare the number determined by the counter with a second threshold and an output of the output signal based on the comparison result of the evaluation circuit.

2. The circuit according to claim 1, wherein the receiver circuit has a digital phase-locked loop or a digital demodulator, and wherein the phase-locked loop has a subtractor configured to output the phase difference.

3. The circuit according to claim 1, wherein the evaluation circuit has a control input for setting the second threshold.

4. The circuit according to claim 1, wherein the second threshold is a increasing function of the clock signal.

5. The circuit according to claim 1, wherein the first comparator is a digital discriminator or a window discriminator.

6. The circuit according to claim 1, wherein the control unit is configured for a time-controlled and/or event-controlled turning on of the receiver circuit.

7. An apparatus, comprising:
circuitry configured to:
receive a modulated signal;
output a phase difference between a phase of a complex baseband signal and a phase precalculated from previous sampled values;
compare the phase difference with a first threshold;
increment a counter in response to determining that the phase difference exceeds the first threshold;
compare an output of the counter with a second threshold; and
turn off a receiver circuit in response to determining that the output of the counter exceeds the second threshold;
wherein the circuitry comprises an evaluation circuit comprising:
a first comparator configured to compare the phase difference with the first threshold;
the counter, wherein the counter comprises an input connected to a clock signal, the counter configured to count pulses of the clock signal when the phase difference exceeds the first threshold; and
a second comparator configured to compare the output of the counter with the second threshold.

8. The apparatus of claim 7, wherein the first comparator comprises a control input, the first comparator configured to set the first threshold based on the control input.

9. The apparatus of claim 7, wherein the second comparator comprises a control input, the second comparator configured to set the second threshold based on the control input.

10. The apparatus of claim 7, wherein the second threshold is an increasing function of the clock signal.

* * * * *